United States Patent
Frost et al.

(10) Patent No.: US 9,641,416 B2
(45) Date of Patent: May 2, 2017

(54) OPERATIONS ANALYSIS OF PACKET GROUPS IDENTIFIED BASED ON TIMESTAMPS

(71) Applicants: Daniel C. Frost, Middlesex (GB); Stewart Frederick Bryant, Merstham (GB); Muthurajah Sivabalan, Kanata (CA); Simon James Trevor Spraggs, Hayling Island (GB)

(72) Inventors: Daniel C. Frost, Middlesex (GB); Stewart Frederick Bryant, Merstham (GB); Muthurajah Sivabalan, Kanata (CA); Simon James Trevor Spraggs, Hayling Island (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/256,185

(22) Filed: Apr. 18, 2014

(65) Prior Publication Data

US 2015/0304185 A1    Oct. 22, 2015

(51) Int. Cl.
*H04L 12/26*    (2006.01)

(52) U.S. Cl.
CPC ........ *H04L 43/106* (2013.01); *H04L 43/0829* (2013.01); *H04L 43/0852* (2013.01)

(58) Field of Classification Search
None
See application file for complete search history.

(56) References Cited

U.S. PATENT DOCUMENTS 7,457,868 B1 *  11/2008  Guo .................... H04L 12/2602
                                                                709/203
8,451,734 B2    5/2013  Cociglio et al.
(Continued)

FOREIGN PATENT DOCUMENTS

WO    2013174417 A1    11/2013

OTHER PUBLICATIONS

Frost and Bryant, "Packet Loss and Delay Measurement for MPLS Networks," RFC 6374, The Internet Society, Reston, VA, USA, Sep. 2011 (fifty-two pages).
Bonda et al., "A packet based method for passive performance monitoring," draft-tempia-opsawg-p3m-02.txt, The Internet Society, Reston, VA, USA, Jul. 16, 2012 (twenty-four pages).
Kompella et al., "Allocating and Retiring Special Purpose MPLS Labels," draft-ietf-mpls-special-purpose-labels-03, The Internet Society, Reston, VA, USA, Jul. 9, 2013 (thirteen pages).
Aggarwal et al., "MPLS Upstream Label Assignment and Context-Specific Label Space," RFC 5331, The Internet Society, Reston, VA, USA, Aug. 2008 (thirteen pages).
Kompella et al., "The Use of Entropy Labels in MPLS Forwarding," RFC 6790, The Internet Society, Reston, VA, USA, Nov. 2012 (twenty-five pages).

(Continued)

*Primary Examiner* — Brandon Renner
*Assistant Examiner* — Jay Vogel
(74) *Attorney, Agent, or Firm* — The Law Office of Kirk D. Williams

(57) ABSTRACT

In one embodiment, operations analysis of packet groups identified based on timestamps is performed. One embodiment includes sending a plurality of sent timeframe groups of a plurality of time-stamped packets from a first packet network node towards a second packet network node in a network and recording first information associated with each of the plurality of said sent timeframe groups of the plurality of time-stamped packets. The second network node receives a plurality of received timeframe groups of a received plurality of time-stamped packets of said sent plurality of time-stamped packets and recording second information associated with each of the plurality of said received timeframe groups of the received plurality of time-stamped packets. Operations analysis based on one or more operations characteristics of said first information and said second information to produce analysis results.

19 Claims, 5 Drawing Sheets

(56) References Cited

U.S. PATENT DOCUMENTS

| | | |
|---|---|---|
| 8,531,987 B2 | 9/2013 | Cociglio |
| 8,635,373 B1* | 1/2014 | Supramaniam ......... H04L 67/42 709/228 |
| 2005/0270982 A1* | 12/2005 | McBeath ................ H04L 1/205 370/252 |
| 2006/0285501 A1* | 12/2006 | Damm ................. H04L 41/142 370/252 |
| 2011/0063988 A1* | 3/2011 | Lee .................... H04L 41/5009 370/252 |
| 2012/0014377 A1* | 1/2012 | Joergensen ......... H04L 43/0852 370/352 |
| 2013/0223274 A1 | 8/2013 | Cociglio et al. |
| 2014/0160975 A1 | 6/2014 | Cociglio |
| 2015/0023170 A1* | 1/2015 | Kakadia .............. H04L 41/0823 370/235 |

OTHER PUBLICATIONS

Bocci et al., "MPLS Generic Associated Channel," RFC 5586, The Internet Society, Reston, VA, USA, Jun. 2009 (nineteen pages).
Rosen et al., "MPLS Label Stack Encoding," RFC 3032, The Internet Society, Reston, VA, USA, Jan. 2001 (twenty-three pages).
"Internet Protocol," DARPA Internet Program Protocol Specification, RFC 791, The Internet Society, Reston, VA, USA, Sep. 1981 (fifty-one pages).
Agarwal et al., "Time to Live (TTL) Processing in Multi-Protocol Label Switching (MPLS) Networks," RFC 3443, The Internet Society, Reston, VA, USA, Jan. 2003 (ten pages).

\* cited by examiner

OPERATIONS ANALYSIS OF PACKET GROUPS IDENTIFIED BASED ON TIMESTAMPS

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Service providers enter into Service Level Agreements (SLA) which set forth certain performance characteristics which must be met. Also, network operators desire to understand the performance of their network. Customers and network providers use various tools to measure certain operational characteristics of their networks.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
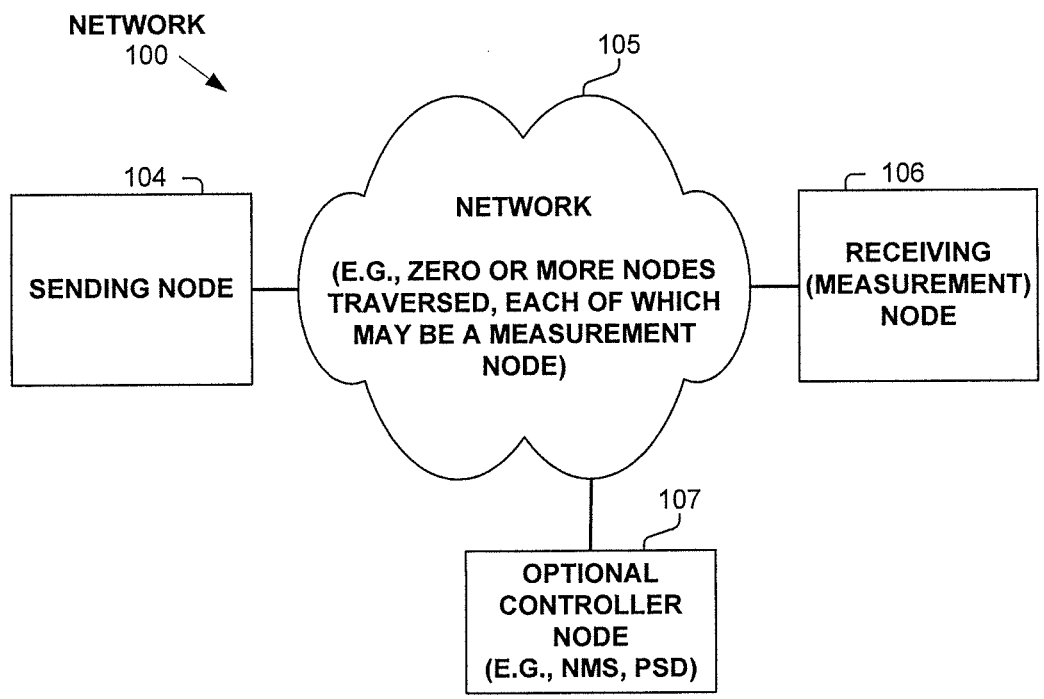
FIG. 1 illustrates a network operating according to one embodiment.

Disclosed are, inter alia, methods, apparatus, computer-storage media, mechanisms, and means associated with operations analysis of packet groups identified based on timestamps. One embodiment includes sending a plurality of sent timeframe groups of a plurality of time-stamped packets from a first packet network node towards a second packet network node in a network and recording first information associated with each of the plurality of said sent timeframe groups of the plurality of time-stamped packets. One embodiment includes receiving, by the second network node, a plurality of received timeframe groups of a received plurality of time-stamped packets of said sent plurality of time-stamped packets and recording second information associated with each of the plurality of said received timeframe groups of the received plurality of time-stamped packets. One embodiment includes performing operations analysis based on one or more operations characteristics of said first information and said second information to produce analysis results. In one embodiment, a timeframe encompasses a corresponding range of timestamps.

2. Description

Disclosed are, inter alia, methods, apparatus, computer-storage media, mechanisms, and means associated with operations analysis of packet groups identified based on timestamps. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

FIG. 1 illustrates a network 100 operating according to one embodiment. Explicitly shown are two network nodes (e.g., packet switching devices) 104 and 106, with an interconnecting network 105 of zero or more packet switching devices and other communication equipment. Additionally shown is an optional controller node 107 (e.g., network management or operations system, packet switching device).

In one embodiment, sending node 104 sends timestamped packets of groups of packets towards receiving node 106. As used herein, a time-stamped packet includes a timestamp within the packet, and the operation of time-stamping a packet includes adding the timestamp to the packet. In one embodiment, sending node 104 time-stamps each packet being sent towards network 106 for measurement at a same place within sending node 104, such as, but not limited to, queuing or dequeuing time or transmit time. In one embodiment, each packet has a different timestamp. In one embodiment, some packets have the same timestamps (e.g., depending on the granularity of the timestamp and the sending rate of packets).

Sending node 104 and measurement node 106 each maintain information (e.g., operational characteristics) of packets received in same timeframes, where a timeframe encompasses a corresponding range of timestamps included in the packets. By sending node 104 and measurement node 106 using the same timeframe, the operational characteristics recorded by each node pertain to the same set of packets. For example in one embodiment, these operations characteristics include a packet count. Therefore, packet loss can be determined by comparing the number of packets in a timeframe sent by node 104 and received by node 106. Other measurement nodes (105) along the path taken by packets being sent by node 104 towards node 106 can also record operations characteristics of packets within same timeframes and subsequently analyzed, for example, to determine where a packet loss occurred. As used herein, a measurement node is a network node (e.g., packet switching device) which receives timeframe groups of packets and records information (e.g., operational characteristics) about the timeframe groups of packets.

By using the timestamp inserted in the packet by sending node 104, measurement nodes 106 and 105 are not required to have their clocks synchronized, but only need to have the timeframe limits (e.g., upper and lower time thresholds) synchronized so that information is recorded appropriately for the same groups of packets.

In one embodiment, clocks are synchronized among sending node 104 and receiving node 106 (and measurement node(s) 105, if any) which makes some measurements (e.g., jitter, delay) easier to acquire and record for packets of timeframe groups.

In one embodiment, some or all of clocks of sending node 104 and receiving node 106 (and measurement node(s) 105, if any) operate with different timescales and/or epochs provided the time parameters are known. In one embodiment, some or all of clocks of sending node 104 and receiving node 106 (and measurement node(s) 105, if any) are partially synchronized clocks provided the degree of synchronization is known and the resultant error is acceptable.

In one embodiment, sending node 104 and measurement nodes 106 (and any measurement nodes 105) communicate via control protocol session(s) such that they collect information on the same timeframes (e.g., same ranges of timestamps included in the packets). Additionally, this recorded information from sending node 104 and measurement node(s) 106 and 105 can be collected on a same device (e.g., sending node 104 or a measurement node 106 or 105) so that the sending and receiving information can be analyzed to produce results (e.g., packet loss, jitter, delay, compliance with a Service Level Agreement). These results may include, but are not limited to, raw, average, minimum and/or maximum values of one or more of these operation characteristics. In one embodiment, packets are filtered/characterized to identify one or more flows of packets on which to perform the measurements. This filtering is synchronized among the sending node 104 and measurement node(s) 106 and 105 such that they operate on the same timeframe groups of packets.

In one embodiment, controller node 107 communicates with sending node 104 and measurement node(s) 106 and 105 to initiate measurements to be taken, to provide ranges of timestamps corresponding to the different timeframe groups of packets, to provide filtering/characterization information for identifying one or more flows of packets on which to operate, to collect recorded information from sending node 104 and measurement node(s) 106 and 105, and/or to analyze the recorded information to produce results.

Figure 2A:
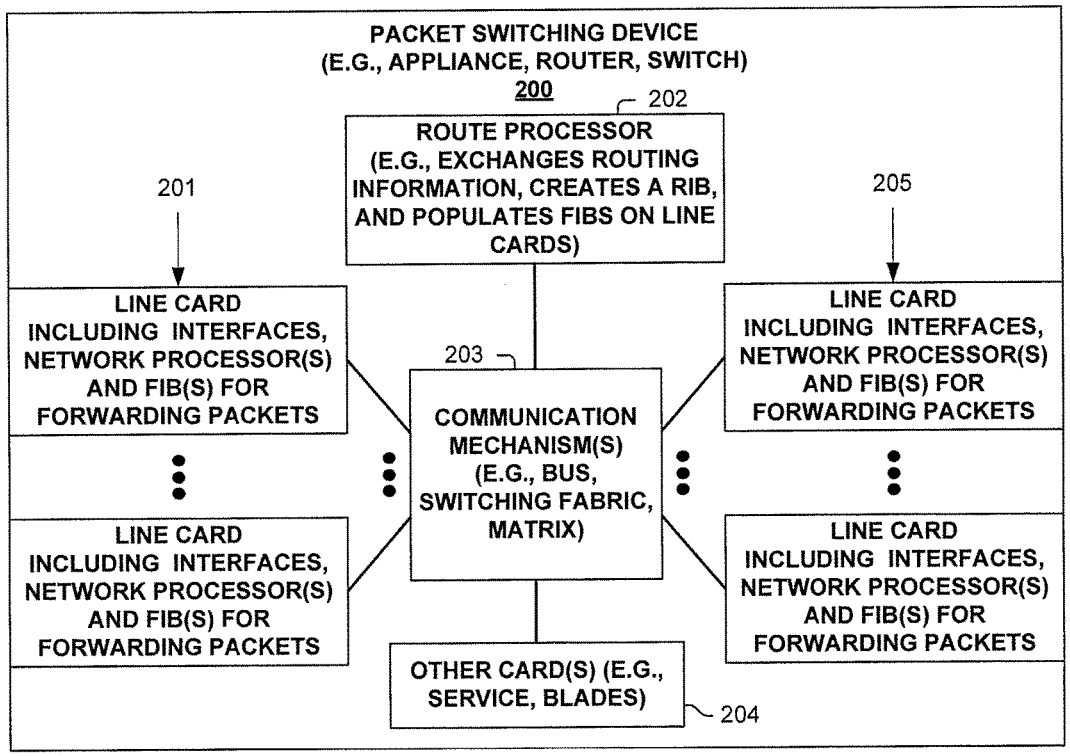
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with operations analysis of packet groups identified based on timestamps. Packet switching device 200 also has a control plane with one or more processing elements 202 for managing the control plane and/or control plane processing of packets associated with operations analysis of packet groups identified based on timestamps. Packet switching device 200 also includes other cards 204 (e.g., service cards, blades) which include processing elements that are used in one embodiment to process packets associated with operations analysis of packet groups identified based on timestamps, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 record information for timeframe groups of packets. Packets of a timeframe group of packets may be sent and/or received on different line cards, interfaces, ports, etc. Each of these different entities typically records information related to each timeframe group of packets, with this distributed collected information being consolidated to acquire aggregate information for the timeframe groups of packets.

Figure 2B:
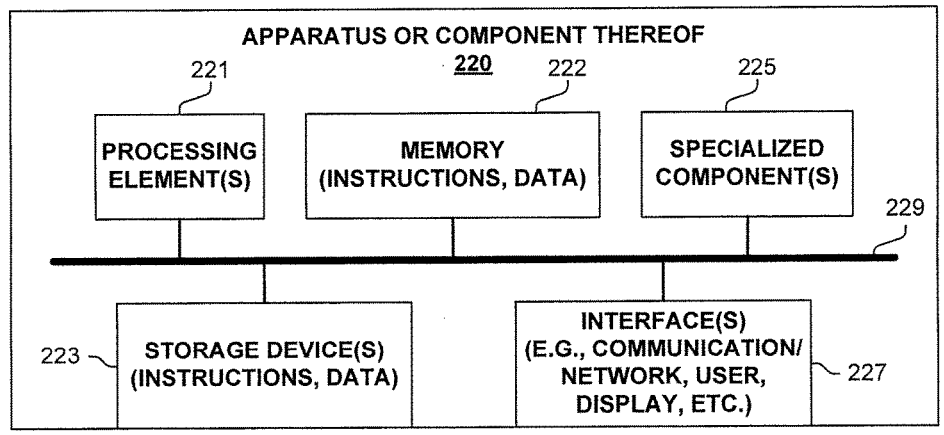
FIG. 2B illustrates an apparatus according to one embodiment.

FIG. 2B is a block diagram of an apparatus 220 used in one embodiment associated with operations analysis of packet groups identified based on timestamps. In one embodiment, apparatus 220 performs one or more processes (which may include synchronization processing), or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
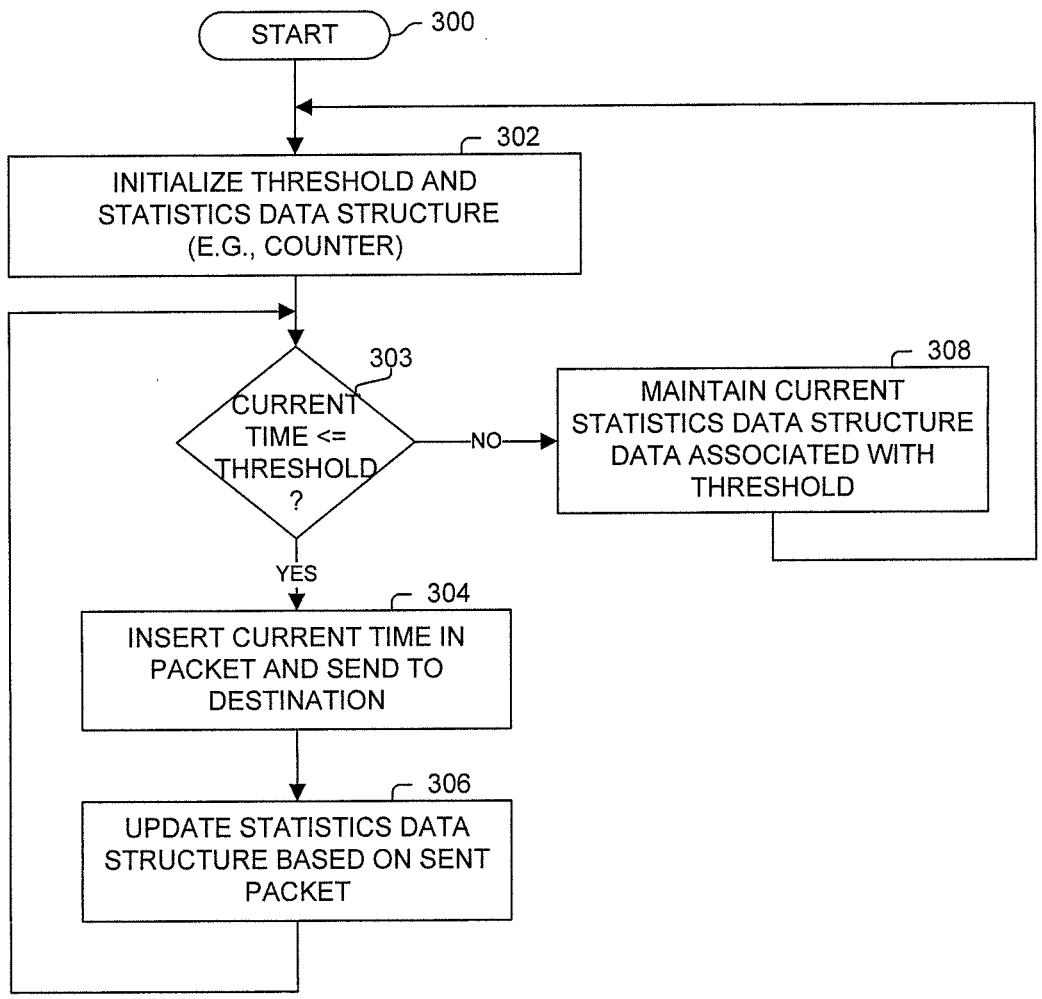
FIG. 3A illustrates a process according to one embodiment.

FIG. 3A illustrates a process performed by a sending node in one embodiment. Processing begins with process block 300. In process block 302, a timeframe threshold value for defining the end of the timestamp group and statistics data structure (e.g., counter(s)) are initialized. In one embodiment, the lower end of the threshold is now or immediately (e.g., when this process is invoked) so is not otherwise defined. One embodiment also defines a lower bound for timestamps associated with a timestamp group. A threshold value may be acquired from a control node, receiving node, from an operational command or a configuration file, based on a predetermined time duration (e.g., each timestamp group will be a predetermined time duration so the threshold value is the current time plus this time duration), or in another manner.

Therefore, in process block 302, the parameters for sending a sequence or flow of related packets in a timeframe group are defined and the data structure is initialized for recording one or more operational characteristics (e.g., packet count). As determined in process block 303, if the current time is less than or equal to the threshold value, then process blocks 304 and 306 are performed. In process block 304, a timestamp reflecting the current time is inserted in a packet and then sent towards the destination. In process block 306, the statistics data structure is updated based on the packet sent (e.g., packet count, byte count, time sent) for later use in operations analysis. Processing returns to process block 303.

Otherwise, as determined in process block 303, the current time has exceed the current threshold value so the previous timeframe group is done, and it is time to send packets in a new timeframe group. In process block 308, the current statistics data structure (typically associated with the threshold value for identification purposes) is maintained for use in subsequent operations analysis. Processing returns to process block 302 to initialize a statistics data structure and new threshold value for the next timestamp group of packets.

Figure 3B:
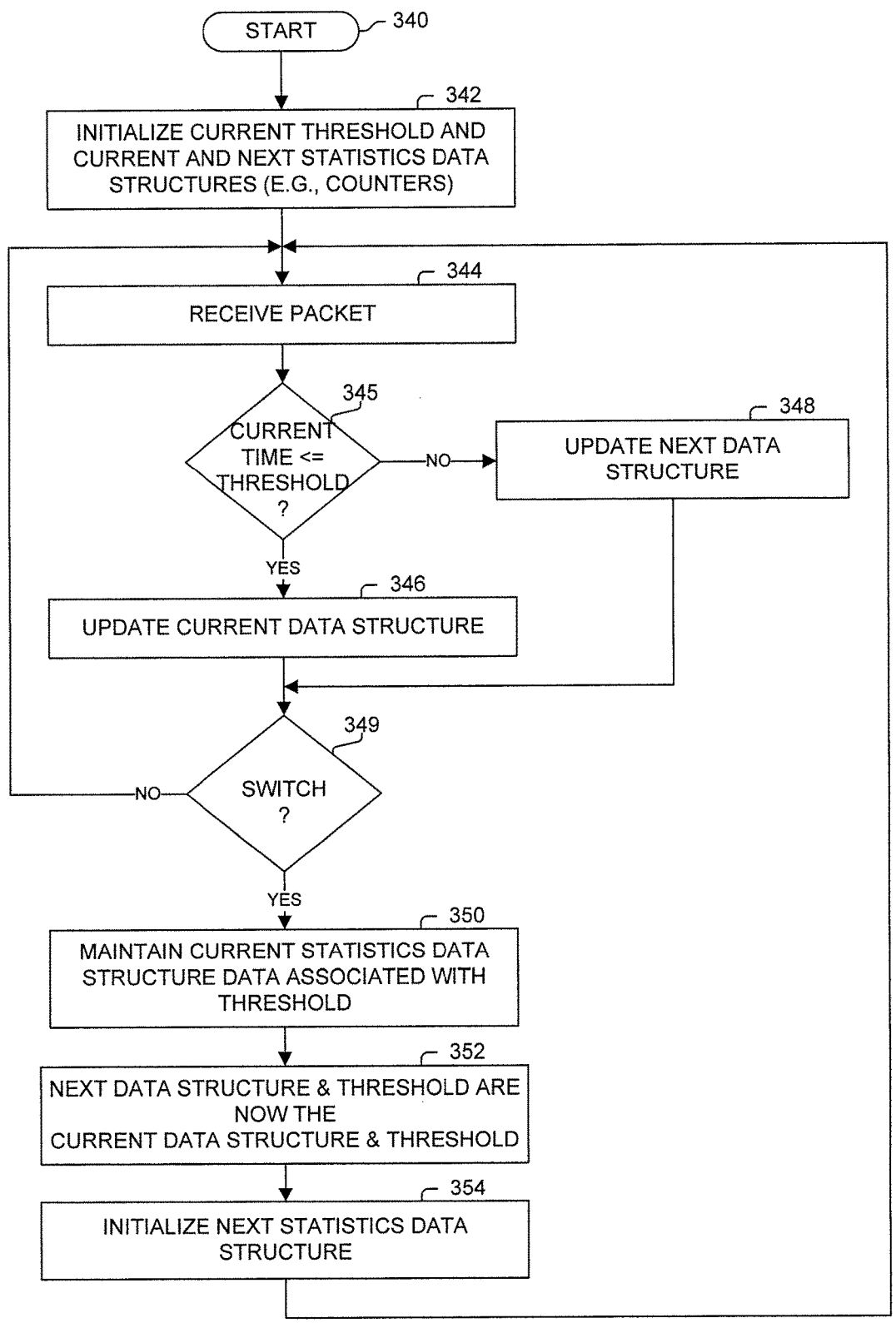
FIG. 3B illustrates a process according to one embodiment.

FIG. 3B illustrates a process performed by a measurement node in one embodiment. Processing begins with process block 340. In process block 342, a timeframe threshold value for defining the end of the timestamp group and a current and a next statistics data structures (e.g., counter(s)) are initialized. As packets may arrive out of order, one embodiment uses a current and a next data structure for recording information pertaining to timestamp groups of received packets.

In one embodiment, the lower end of the threshold is now or immediately (e.g., when this process is invoked) so is not otherwise defined. One embodiment also defines a lower bound for timestamps associated with a timestamp group. A threshold value may be acquired from the sending node, a control node, from an operational command, a configuration file, based on a predetermined time duration (e.g., each timestamp group will be a predetermined time duration so the threshold value is the current time plus this time duration), or in another manner.

Therefore, in process block 342, the parameters for receiving a sequence or flow of related packets in a timeframe group are defined and the current and next data structures are initialized for recording one or more operational characteristics (e.g., packet count). A packet is received in process block 344. As determined in process block 345, if the timestamp in the received packet is less than or equal to the threshold value, then in process block 346, the current data structure is updated with information related to the received packet of the current timestamp group of packets; otherwise, in process block 348, the next data structure is updated with information related to the received packet of the next timestamp group of packets. As determined in process block 349, if no more packets of the current timestamp group of packets are expected (e.g., a certain number of packets of the next timeframe group have been received or a timer expired), then process blocks 350-354 are performed; otherwise processing returns to process block 344. In process block 350, the current statistics data structure (typically associated with the threshold value for identification purposes) is maintained for use in subsequent operations analysis. In process block 352, the next threshold and data structure are now the current threshold and data structure. In process block 354, the next statistic data structure is initialized. Processing returns to process block 344.

Figure 3C:
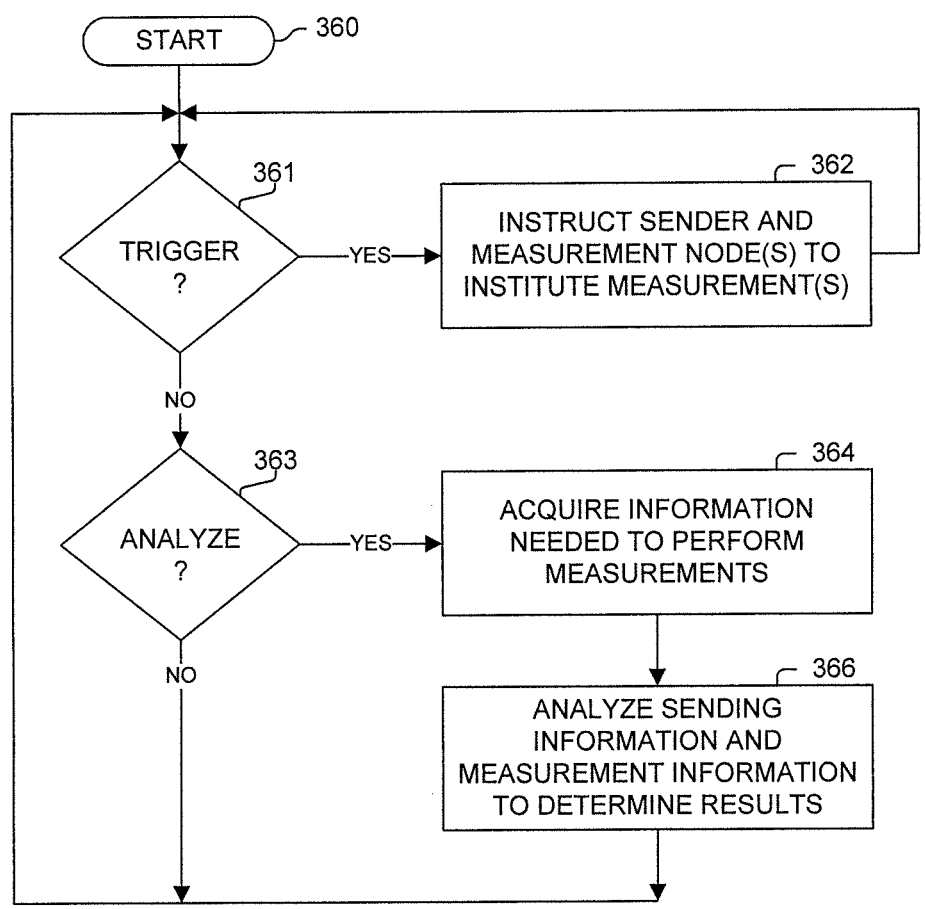
FIG. 3C illustrates a process according to one embodiment.

FIG. 3C illustrates a process performed by a controller, sending node, or measurement node in one embodiment. Processing begins with process block 360. As determined in process block 361, if measurement of timestamp groups of packets should be instituted, then in process block 362, the sender and measurement node(s) are instructed to institute measurements for timestamp groups of packets. In one embodiment, this instruction includes control information such as, but not limited to, measurement duration, threshold values, and/or flow characteristics, etc. Processing returns to process block 361. Otherwise, processing continues to process block 363. As determined in process block 363, if recorded information by sending and measurement nodes should be analyzed, then in process block 364, the information needed to perform this analysis is acquired (e.g., from one or more of the sending and/or measurement nodes if not already acquired); and in process block 366, this information is analyzed to produce analysis results. In one embodiment, these analysis results include, but are not limited to, packet loss, jitter, delay, and/or compliance with a Service Level Agreement, etc. Processing returns to process block 361.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    sending a plurality of sent timeframe groups of a plurality of time-stamped packets from a first packet network node towards a second packet network node in a network and recording first information associated with and distinguishable for each of the plurality of said sent timeframe groups of the plurality of time-stamped packets in a first data structure in the first packet network node, with timestamps of said time-stamp packets of each of the plurality of sent timeframe groups falling within a different sent range of timestamp values;
    receiving, by the second network node, a plurality of received timeframe groups of a received plurality of time-stamped packets of said sent plurality of time-stamped packets and recording second information associated with and distinguishable for each of the plurality of said received timeframe groups of the received plurality of time-stamped packets in a second data structure in the second packet network node, with timestamps of said time-stamp packets of each of the plurality of received timeframe groups falling within a different received range of timestamp values, and with each one of the different received ranges of timestamp values synchronized with one of the different sent ranges of timestamp values in order to correlate each particular received timeframe group of the plurality of received timeframe groups with a particular sent timeframe group of the plurality of sent timeframe groups; and
    in response to determining to perform analysis: acquiring said first information associated with each of the plurality of said sent timeframe groups of the plurality of time-stamped packets remotely from the first data structure in the first packet network node or said second information associated with each of the plurality of said received timeframe groups of the received plurality of time-stamped packets remotely from the second data structure in the second network node; and performing operations analysis to produce analysis results based on one or more operations characteristics identified in said first information and said second information of said correlated sent and received timeframe groups;
    wherein a timeframe encompasses a corresponding range of timestamps.

2. The method of claim 1, wherein each of the plurality of time-stamped packets is stamped with a different timestamp.

3. The method of claim 1, wherein the number of sent timeframe groups in the plurality of sent timeframe groups is at least three, and the number of received timeframe groups in the plurality of received timeframe groups is at least three.

4. The method of claim 1, wherein said one or more operations characteristics of said first information and said second information includes counts of packets with corresponding groups of packets.

5. The method of claim 4, wherein said analysis results include a measurement of packet loss.

6. The method of claim 5, wherein each of the plurality of time-stamped packets is stamped with a different timestamp.

7. The method of claim 1, wherein said analysis results includes a determination of whether compliance with a Service Level Agreement (SLA) is met for the plurality of time-stamped packets.

8. The method of claim 1, wherein said analysis results includes a measurement of packet delay.

9. The method of claim 1, comprising: determining, by the second network node, which of the plurality of received timeframe groups each particular received time-stamped packet of said sent plurality of time-stamped packets is a member based on the timestamp of said particular received time-stamped packet.

10. The method of claim 1, wherein the second packet network node receives a first portion of the packets of said time-stamped packets received by the second packet network node on a first interface of the second packet network node, and receives a second portion of the packets of said time-stamped packets received by the second packet network node on a second interface, different than the first interface, of the second packet network node.

11. The method of claim 1, wherein the second packet network node receives a first portion of the packets of said time-stamped packets received by the second packet network node on a first line card of the second packet network node, and receives a second portion of the packets of said time-stamped packets received by the second packet network node on a second line card, different than the first line card, of the second packet network node.

12. A method, comprising:
    receiving, by a second network node in a network, a received plurality of time-stamped packets sent from a first network node in the network;
    identifying, by the second network node, for each particular received time-stamped packet of the received plurality of time-stamped packets a corresponding particular received timeframe group of a plurality of received timeframe groups based on a timestamp included in said particular received time-stamped packet, and updating second information associated with and distinguishable for said particular received timeframe group based on said particular received time-stamped packet in a second data structure in the second network node, with timestamps of said received time-stamp packets for each of the plurality of received timeframe groups falling within a different received range of timestamp values, with each of the plurality of received timeframe groups corresponding to a sent timeframe group of a plurality of sent timeframe groups in the first network node, with timestamps of packets in each of the plurality of sent timeframe groups falling within a different sent range of timestamp values, and with each one of the different received ranges of timestamp values synchronized with one of the different sent ranges of timestamp values in order to correlate each particular received timeframe group of the plurality of received timeframe groups with a particular sent timeframe group of the plurality of sent timeframe groups;

acquiring first information associated with and distinguishable for each of the plurality of sent timeframe groups from the first network node or sending said second information to the first network node; and performing operations analysis to produce analysis results by the first network node or the second network node based on one or more operations characteristics identified in said first information and said second information of said correlated sent and received timeframe groups;

wherein a timeframe encompasses a corresponding range of timestamps.

13. The method of claim 12, wherein said operations analysis is performed by the second network node.

14. The method of claim 12, wherein said operations analysis is performed by the first network node.

15. The method of claim 12, wherein said operations analysis is performed by a network node different than the first network node and the second network node.

16. The method of claim 12, wherein said analysis results includes a measurement of packet loss.

17. The method of claim 12, wherein said analysis results includes a measurement of packet loss for each of the plurality of received timeframe groups.

18. A packet switching device, comprising:
one or more processing elements;
memory;
storage that stores information;
a plurality of interfaces that send and receive packets; and
one or more packet switching mechanisms that packet switch packets among said interfaces;

wherein the packet switching device performs operations, including:

identifying for each particular received time-stamped packet of a received plurality of time-stamped packets a corresponding particular received timeframe group of a plurality of received timeframe groups based on a timestamp included in said particular received time-stamped packet;

updating second information in said storage associated with and distinguishable for said particular received timeframe group based on said particular received time-stamped packet, with timestamps of said received time-stamp packets for each of the plurality of received timeframe groups falling within a different received range of timestamp values, with each of the plurality of received timeframe groups corresponding to a sent timeframe group of a plurality of sent timeframe groups in the first network node, with timestamps of packets in each of the plurality of sent timeframe groups falling within a different sent range of timestamp values, and with each one of the different received ranges of timestamp values synchronized with one of the different sent ranges of timestamp values in order to correlate each particular received timeframe group of the plurality of received timeframe groups with a particular sent timeframe group of the plurality of sent timeframe groups; and in response to determining to perform analysis: acquiring first information associated with and distinguishable for each of the plurality of sent timeframe groups timeframe groups from the first network node, and performing operations analysis to produce analysis results based on one or more operations characteristics identified in said first information and said second information of said correlated sent and received timeframe groups;

wherein a timeframe encompasses a corresponding range of timestamps.

19. The packet switching device of claim 18, wherein said second information includes a count of packets received by a second packet switching device and said identified with the corresponding received timeframe group of the plurality of received timeframe groups.

* * * * *